Feb. 17, 1970   A. T. NORDSIECK   3,495,465
PHASE MODULATED ELECTRIC SUSPENSION
Filed Aug. 28, 1968   2 Sheets-Sheet 2

INVENTOR.
Arnold T. Nordsieck
BY
Thomas N. Young
ATTORNEY

United States Patent Office 3,495,465
Patented Feb. 17, 1970

1

3,495,465
PHASE MODULATED ELECTRIC SUSPENSION
Arnold T. Nordsieck, Santa Barbara, Calif., assignor to General Motors Corporation, Detroit, Mich., a corporation of Delaware
Filed Aug. 28, 1968, Ser. No. 755,861
Int. Cl. G01c 19/30
U.S. Cl. 74—5                5 Claims

ABSTRACT OF THE DISCLOSURE

A three-axis electric support system for a spherical conductive object such as a free gyro rotor. Diametrically opposite pairs of capacitive plates adjacent the object are supplied with the sum and difference of two constant amplitude AC currents, one of fixed phase and the other of selectively variable phase. Position sensing feedback circuits vary the phase of one signal with respect to the other to maintain the objects in a reference position and to maintain constant the scalar sum of forces on the object due to any pair of plates.

Figure 1:
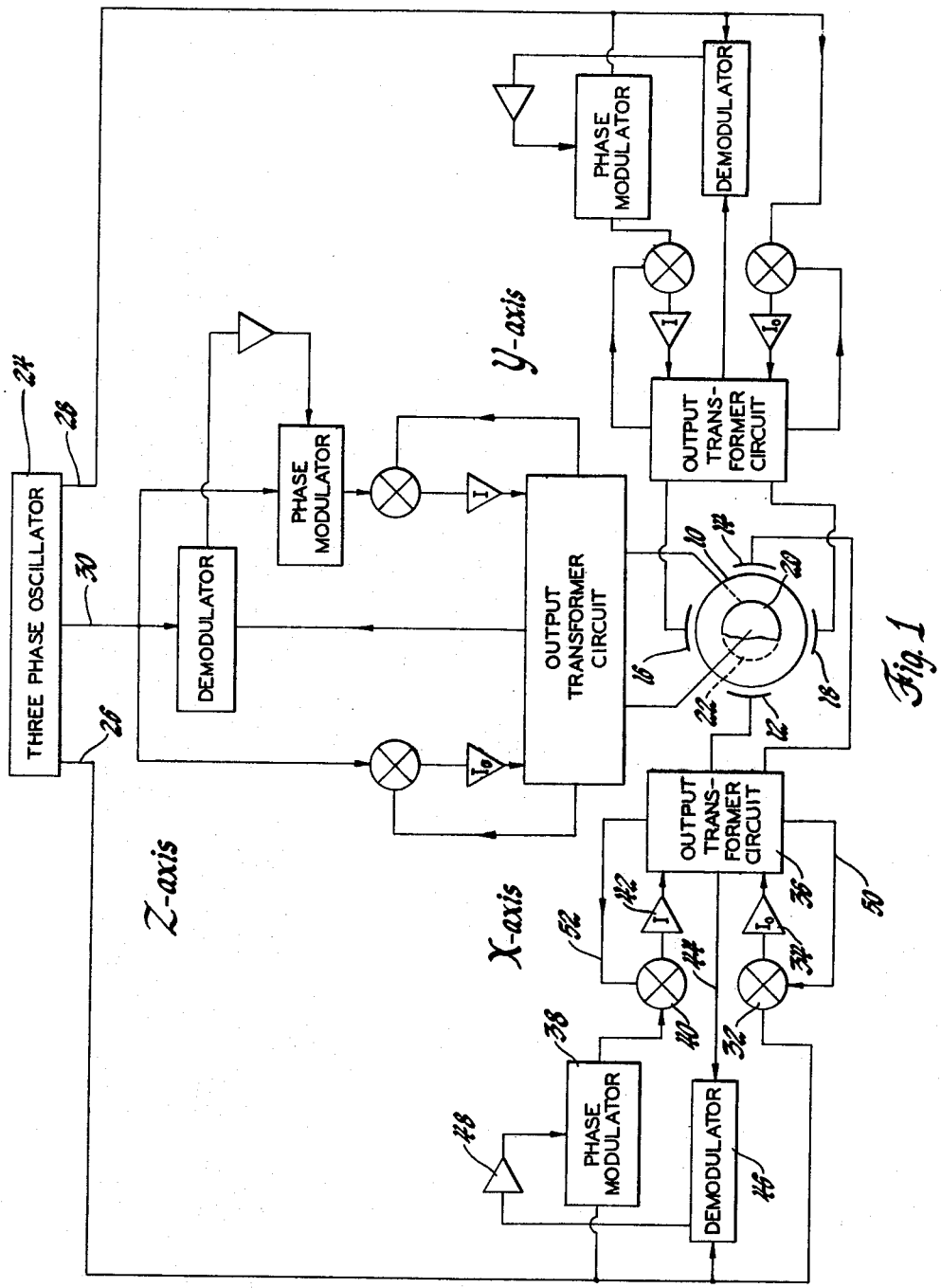

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to electric systems for freely suspending conductive objects and, more particularly, to apparatus for producing a plurality of controlled electric fields to maintain a conductive object suspended between a plurality of capacitive electrodes.

U.S. Patent No. 3,003,356 describes the application of such a system to the support of a spherical rotor for a gyroscope. The spherical rotor, freely suspended between a plurality of electrodes, may be rotated at high speed about a spin axis to define an inertial reference for navigation purposes. Since the spinning rotor tends to maintain a fixed orientation in space, changes in the orientation of the surrounding apparatus may be monitored by reference to the rotor.

An electric suspension system using opposing fields is not inherently stable, therefore it is necessary to continuously vary the field components to maintain the suspended body in a central position with respect to the field electrodes. In the above mentioned patent, stability is accomplished by connecting the field electrodes in a position-sensitive servo system which varies the opposing field components by summing a constant amplitude current with a variable amplitude current. Accordingly, the rotor is kept centered in the presence of accelerations which tend to shift the rotor with respect to the electrodes.

In the present invention, stability is also accomplished by varying the field component strength in a position-sensitive servo system. However, the present suspension system differs from the previous system in that the field variations are accomplished by combining a constant phase current with a variable phase current. This phase modulation approach has the advantage, among others, of maintaining the sum of forces on the suspended body constant thus minimizing tangential torques which tend to reorient the spin axis of the body if it is not ideally spherical and thus disturb any inertial reference which may have been established.

Briefly, this is accomplished by energizing at least a pair of opposing electrodes, between which a conductive sphere is placed, with two currents of fixed amplitude but relatively variable phase. Circuit means are provided

2 for applying the sum of the currents to one electrode and the difference of the currents to the other electrode. Feedback means are provided to sense displacement of the sphere relative to the electrodes and to vary the phase difference between the currents thus to vary the ratio of the forces produced by the field components between the electrodes and the sphere.

Figure 2:
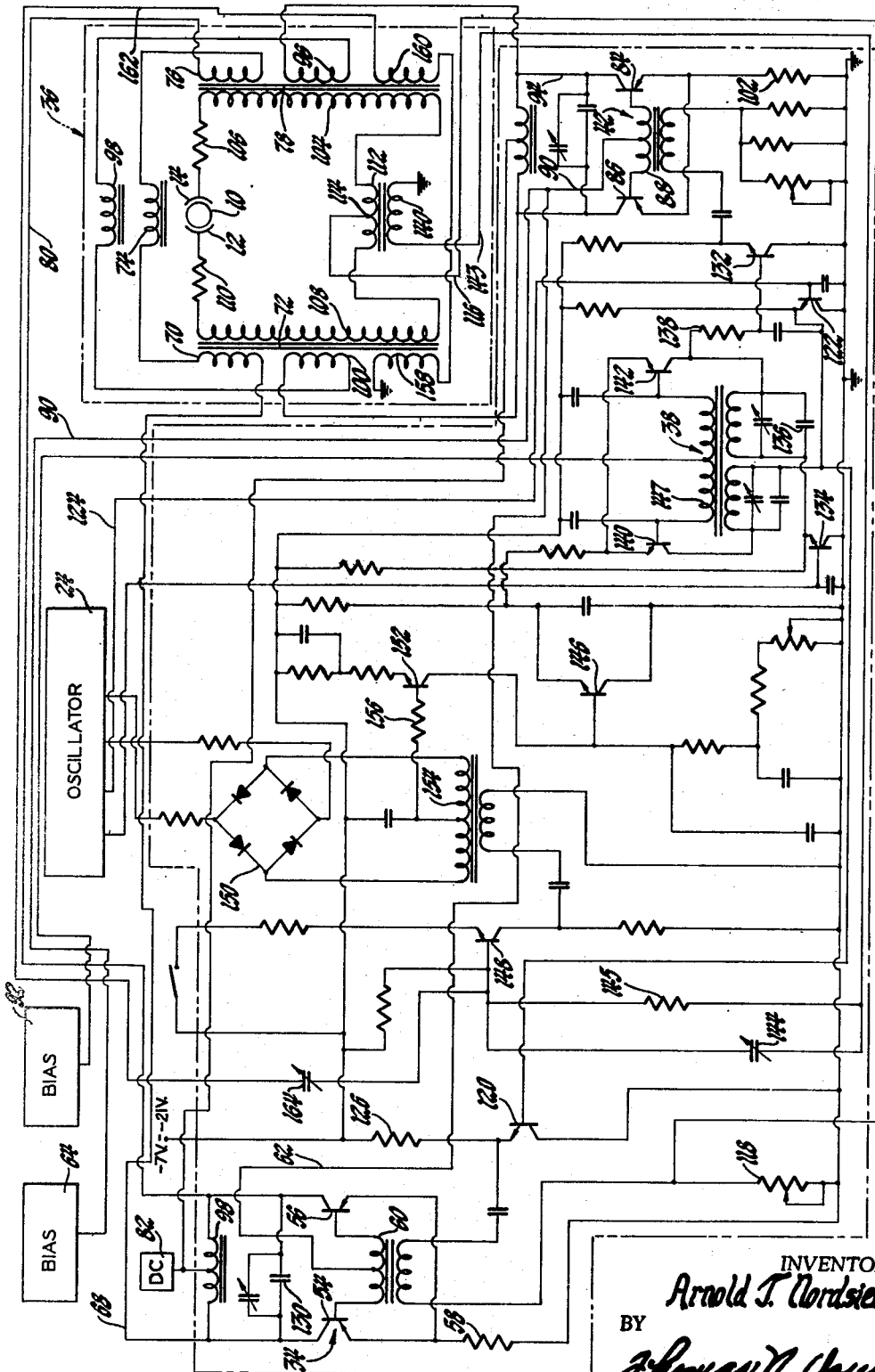

The particular embodiment of the invention chosen for illustration is a system employing three pairs of opposing electrodes located along three mutually perpendicular diameters of the sphere. The illustrative system is described fully in the following specification which is to be taken with the accompanying drawings, of which:

FIGURE 1 is a block diagram of a three-axis support system for a spherical object; and FIGURE 2 is a schematic circuit diagram of a representative portion of the FIGURE 1 system.

Referring to FIGURE 1, the apparatus is shown to include a hollow conductive sphere 10. Beryllium is a suitable material from which to construct the sphere 10. The sphere 10 is disposed in the center of a group of capacitive plates which generally conform to but are spaced from the surface of the sphere 10. The plates may be mounted on nonconductive enclosing hemispheres, not shown, to form a hermetic chamber. Such a chamber might be evacuated to eliminate air drag on the sphere 10 when rotated to provide an inertial reference.

The plates are arranged in pairs along three mutually perpendicular axes referred to in the drawing as X, Y and Z. Plates 12 and 14 are on diametrically opposite sides of sphere 10 along the X axis; plates 16 and 18 are diametrically opposite one another along the Y axis and plates 20 and 22, of which only 20 is fully visible in the drawing, are diametrically opposite one another along the Z axis of sphere 10. Each pair of capacitive plates has associated therewith electronic circuit apparatus which produces between the plates and the sphere electric fields which generate forces of attraction on the sphere 10. When all of these forces are in equilibrium with gravity and other accelerative forces acting on sphere 10, sphere 10 is maintained in a reference position which is substantially central of the arrangement of plates.

The sphericity of the supported object, of course, influences the operation of the system. A method for producing an object which is spherical when rotated at high speed is described in the patent to Nordsieck 3,274,666, issued Sept. 27, 1966. The patent states that sphere 10 may be designed to be slightly oblate when at rest so as to be distorted toward sphericity when rotated at the design speed.

The circuitry for providing the currents to the capacitive plates shown in FIGURE 1 includes a three-phase oscillator 24 having outputs 26, 28 and 30 connected to the X, Y, and Z axis circuitry as shown. The outputs 26, 28 and 30 provide sinusoidal wave forms which are spaced in phase by 120 electrical degrees. Since inspection of the drawing indicates that the circuitry associated with the X, Y and Z axes are all identical, specific reference will be taken to the X axis apparatus as representative of the remaining two axes.

The sinusoidal waveform appearing on output 26 is connected through an adder 32 to the input of a driver amplifier 34 which produces an alternating current output signal of constant amplitude and fixed phase, hereinafter identified as $I_0$. This signal is connected to an output transformer circuit 36 which combines the fixed phase signal with a variable phase signal in a manner to be described and applies the combination to plates 12 and 14.

The sinusoidal signal on output 26 is further connected to a phase modulator 38 which serves to selectively vary the phase angle of the output therefrom with respect to the phase angle of the output of driver amplifier 34. The output of phase modulator 38 is connected through a second adder 40 to a driver amplifier 42, the output of which is also connected to the output transformer circuit 36. The output of driver amplifier 42, hereinafter identified as I, is also of constant amplitude and is equal in amplitude to $I_O$ but varies in phase with respect to $I_O$ in accordance with the degree of phase shift introduced at 38 which, in turn, is determined by displacements of sphere 10 relative to plates 12 and 14.

Output transformer circuit 36 receives the currents $I_O$ and I and combines them in such a fashion as to present the sum of the currents to capacitive plate 12 and the difference between the currents to capacitive plate 14. The currents I and $I_O$ are of similar waveform and amplitude. Thus, assuming a reference position phase shift between $I_O$ and I of 90°, it is apparent that the signals applied to the capacitive plates 12 and 14 are substantially of equal amplitude. Moreover, it is apparent that a shift in phase of I introduced by phase modulator 38 varies the ratio between the squared amplitude of the sum current applied to plate 12 and the squared amplitude of the difference current applied to plate 14, which is the same as the ratio between the attractive force exerted by plate 12 on sphere 10 and the attractive force exerted by plate 14 on sphere 10, but in accordance with mathematical laws governing addition of phasors, maintains the sum of the aforesaid two attractive forces constant. For example, if sphere 10 shifts toward plate 14 it is necessary to maintain stability to decrease the force of attraction between plate 14 and sphere 10 and to increase the force of attraction between plate 12 and sphere 10. This may be accomplished by varying the phase of the I signal to decrease the difference component applied to plate 14 and to increase the sum component applied to plate 12.

To accomplish this controlled phase modulation a position feedback signal from output transformer 36 is applied via line 44 to a demodulator circuit 46. Under the control of the output 26 of oscillator 24, circuit 46 demodulates the position feedback signal and controls the phase modulator 38 through an amplifier 48. Further, in order to maintain the constancy of sum of forces on sphere 10 in the presence of displacement of the sphere relative to the plates 12 and 14, it may be necessary to introduce current amplitude compensation into the amplifiers 34 and 42. These compensation circuits are schematically indicated at 50 and 52 respectively.

As previously described, the Y axis and Z axis circuits are identical to the X axis circuit and receive their basic timing reference from the outputs 28 and 30 of the three phase oscillator 24. Since these signals are spaced by 120° the sphere 10 may be used as a floating ground for the current components applied thereto by the three sets of capacitive plates. Further, since the sum of forces constancy is achieved in each set of plates, it is also achieved by the combination of the three sets.

FIGURE 2 illustrates in detail a circuit for implementing the block diagram of FIGURE 1. Again, only one axis is illustrated with the understanding that it represents all of the axes of any given system.

The fixed phase driver amplifier 34 comprises transistors 54 and 56 the emitters of which are also connected to ground through a resistor 58. The base electrodes of transistors 54 and 56 are also connected across a center tapped winding 60, the center tap of which is connected through line 62 to bias source 64 which is part of the oscillator 24. The output of the push-pull stage including transistors 54 and 56 is taken across the collector electrodes. This output traced from the collector of 54 includes conductor 68, the primary winding 70 of output transformer 72, a fixed inductor 74 and the primary winding 76 of output transformer 78 and thence back through line 80 to the collector of transistor 56. A DC supply source 82 is connected to the push-pull amplifier transistors 54 and 56 through opposite legs of a center tapped winding 98.

The variable phase current driver amplifier 42 for the I component comprises a push-pull stage including transistors 84 and 86 having their bases connected together across a center tapped transformer winding 88. The center tap may be connected by way of conductor 90 to the bias source 64. The output of the I current driver amplifier 42 is obtained across the collector electrodes of transistors 84 and 86. DC supply 82 is also connected to amplifier 42. The collector of 84 is connected by way of line 94 to a second primary winding 96 of output transformer 78 and through a fixed inductor element 98 to a second primary winding 100 of an output transformer 72 and thence back to the collector of transistor 86. The emitters of transistors 84 and 86 are connected to ground through resistor 102.

Inspection of FIGURE 2 shows that the primary windings 76 and 96 are wound in the same sense so as to add the current components $I_O$ and I. The sum of the currents thus produces a voltage across transformer secondary winding 104 which is applied through resistor 106 to capacitive plate 14. Inspection of FIGURE 2 also indicates that primary windings 70 and 100 of transformer 72 are wound in the opposite sense. Therefore, the signal which appears across secondary winding 108 is related to the difference between the current components $I_O$ and I. This signal is applied through a fixed resistor 110 to capacitive plate 12. The other ends of each of the secondary windings 104 and 108 are connected to opposite ends of a transformer winding 112 the center tap 114 of which is connected through line 116 and resistor 118 to ground. Accordingly, separate circuits are provided in the output transformer circuit 36 for generation of the sum and difference current signals.

Referring again to FIGURE 2 it is to be understood that a circuit such as shown here is associated with each phase of the oscillator 24 and, therefore, with each axis of rotor displacement. The fixed phase output $I_O$ from push-pull amplifier 34 is obtained by driving the amplifier from the emitter follower stage 120 by way of emitter follower stage 122 which in turn is driven by the oscillator 24 through line 124. The electrode current from the $I_O$ amplifier 34 tends to be highly stabilized first because of the high collector impedance of the push-pull amplifier itself, and secondly, because of the negative feedback loop which operates as follows. The sum of the electrode currents develops a voltage across resistor 118 and that voltage subtracts from the push-pull drive voltage. Thereby, the output impedance is approximately doubled.

The electrode current waveform is improved and the push-pull current amplifier load impedance is lowered by providing the load circuit a parallel resonant circuit comprising inductor 98 and capacitor 130 and a series resonant circuit 74 and the electrode capacitance reflected across the output transformer windings. The shunt impedance across the push-pull collector terminals is nearly purely resistive.

The variable phase amplifier 42 is driven by emitter follower stage 132. However, stage 132 as indicated in FIGURE 1 is driven by the output of the phase modulator 38. Oscillator 24 drives the emitter followers 134 and 122 180 degrees out of phase and at substantially the same level. Between the emitters of 134 and 122 is connected a series combination of capacitor 136 and a voltage controlled variable resistor which comprises a small fixed resistor 138 and the shunt impedance of a parallel resonant circuit which is accurately tuned to the carrier frequency. This parallel resonant circuit is configured so that a balanced amplifier comprising transistors 140 and 142 can be coupled to it in a negative feedback fashion to lower its shunt impedance by a controlled amount. The base electrodes of transistors 140 and 142 are connected across a capacitively tuned transformer having a center tapped primary 147. The center tap is connected to a bias source 92. This configuration is substantially the same as that of a conventional oscillator section except for reversed polarity of feedback. A direct current of amount controlled by transistor 146 is switched from side to side of the resonant circuit by 140 and 142 which act as a differential amplifier.

To further explain the operation of the phase modulator, given the variable R it follows from Kirchoff's laws that the voltage at the base of transistor 132 has a constant level equal to the common level at the emitters of transistors 122 and 134 and a phase relative to the phase at the emitter of 134 given by $\phi = 2$ arc tan $(\omega RC)$ where $\omega$ is the carrier radian frequency. Accordingly, $\phi$ can be modulated by modulating R.

The rotor position error signal is generated by a displacement of rotor 10 with respect to plates 12 and 14. This displacement tends to unbalance the potentials at opposite ends of transformer winding 112. This unbalance is reflected through the transformer to winding 140. The apparent unbalance due to the I current is subtracted out of the so generated error signal by transformer windings 158 and 160 through line 162 and the differentiating capacitor 164. This position error signal is connected to line 143 and a differentiating circuit comprising capacitor 144 and resistor 145 to the base of transistor 148 and is an amplitude modulator carrier signal either in phase or 180 degrees out of phase with $I_O$ depending on the sense of the displacement of sphere 10. It is synchronously demodulated by a diode full wave bridge 150. The output of full wave demodulator bridge 150 is connected to the base of transistor 152 from a center tap on transformer winding 154 through resistor 156.

Transistor 146 is driven by the demodulated and compensated error signal from amplifier stage 152 so that the phase of I and consequently the force is controlled by the displacement of sphere 10. Transistors 146 and 152 are simply DC amplifier stages. All of the compensation is performed in the stage 152 which has a lag network in the base circuit and a lead-lag combination in the emitter circuit and in the collector circuit. The collector lead-lag provides enhanced low frequency stiffness in the region from about 10 c.p.s. downward. The lead-lag in the emitter circuit provides damping between 100 c.p.s. and 4,500 c.p.s. and in the designed rate range of resonant frequencies 300 c.p.s. to 900 c.p.s. the damping is better than one half critical damping.

FIGURE 2 also shows the presence of certain small capacitors which are connected to the base of several of the transistors. These capacitors go to bases driven by transformer windings and may serve to suppress a parasitic high frequency transient which may be attributed to small leakage reactances of the transformer windings.

While the subject invention has been described with reference to a specific embodiment it is to be understood that this description is to be construed as illustrative rather than limiting for various modifications will be apparent to those skilled in the art. For example, it may be desirable to employ an embodiment using more capacitive plates and more phases of supply current. A six phase, twelve plate system wherein the plates are regularly disposed about the sphere has been found to be a practical alternative embodiment to that specifically described herein.

I claim:
1. Apparatus for supporting a conductive object in controlled electric fields comprising: a pair of spaced apart capacitor plates, a conductive body disposed between the plates and spaced therefrom, means for producing a first alternating current of constant amplitude and fixed phase, means for producing a second alternating current of constant amplitude and variable phase, output circuit means for receiving the first and second currents and for applying the sum of said currents to one of said plates and the difference of said currents to the other of said plates, thereby to provide forces supporting the body in a reference position between the plates, and feedback means to detect a displacement of said body relative to the plates and to vary the phase of said second current to vary the ratio of said forces to restore the body to the reference position.

2. Apparatus as defined in claim 1 wherein the object is a metallic sphere and the plates are configured to correspond to the curvature of said sphere.

3. Apparatus as defined in claim 1 wherein said output circuit means comprises a first transformer having two primary windings of like sense and a secondary winding, a second transformer having two primary windings of opposite sense and a secondary winding, means connecting the first and second currents to separate primary windings of the first and second transformers, and means connecting the secondary windings in separate circuits to respective plates.

4. Apparatus for supporting a conductive object in controlled electric fields comprising first, second and third pairs of spaced apart capacitor plates disposed along first, second and third support axes, respectively, which are mutually perpendicular, a conductive body of substantially spherical configuration disposed substantially centrally of said plates and spaced therefrom, the apparatus further including for each of said pairs of plates, means for producing a first alternating current of constant amplitude and fixed phase, means for producing a second alternating current of constant amplitude and variable phase, output circuit means for receiving the first and second currents and for applying the sum of said currents to one of said plates and the difference of said currents to the other of said plates, thereby to provide forces supporting the body in a reference position between the plates, and feedback means to detect a displacement of said body relative to the plates and to vary the phase of said second current to vary the ratio of said forces to restore the object to the reference position.

5. Apparatus as described in claim 4 including a three phase oscillator for producing three alternating signals mutually separated by 120 electrical degrees, the alternating current-producing means for the first, second and third axes being connected to derive said currents from respective oscillator signals whereby the net voltage of the body is substantially zero.

References Cited
UNITED STATES PATENTS

| | | | |
|---|---|---|---|
| 3,003,356 | 10/1961 | Nordsieck | 74—5 |
| 3,098,679 | 7/1963 | Deboice | 317—262 XR |
| 3,262,326 | 7/1966 | Schott | 74—5 |
| 3,295,379 | 1/1967 | Jensen et al. | 74—5 XR |
| 3,320,817 | 5/1967 | Iddings | 74—5.6 |
| 3,379,070 | 4/1968 | Spiegel | 74—5 |
| 3,451,274 | 6/1969 | Davies et al. | 74—5.7 XR |

FRED C. MATTERN, JR., Primary Examiner

M. A. ANTONAKAS, Assistant Examiner

U.S. Cl. X.R.

74—5.41; 317—262